United States Patent
Shiohara et al.

(10) Patent No.: US 9,218,787 B2
(45) Date of Patent: *Dec. 22, 2015

(54) IMAGE-DISPLAYING DEVICE AND DISPLAY TIMING CONTROL CIRCUIT

(71) Applicant: SEIKO EPSON CORPORATION, Tokyo (JP)

(72) Inventors: Ryuichi Shiohara, Nagano (JP); Masahiro Kitano, Tokyo (JP); Toshiyuki Yamamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/524,284

(22) Filed: Oct. 27, 2014

(65) Prior Publication Data

US 2015/0042860 A1 Feb. 12, 2015

Related U.S. Application Data

(63) Continuation of application No. 13/109,420, filed on May 17, 2011, now Pat. No. 8,937,673.

(30) Foreign Application Priority Data

May 18, 2010 (JP) ................................. 2010-113978
Sep. 27, 2010 (JP) ................................. 2010-214841

(51) Int. Cl.
*H04N 5/222* (2006.01)
*G09G 5/12* (2006.01)
(Continued)

(52) U.S. Cl.
CPC .................. *G09G 5/12* (2013.01); *G09G 5/393* (2013.01); *G09G 5/395* (2013.01); *H04N 5/23293* (2013.01); *G09G 2340/0407* (2013.01); *G09G 2360/121* (2013.01); *H04N 2101/00* (2013.01)

(58) Field of Classification Search
CPC . H04N 5/232; H04N 5/23293; H04N 5/2251; G09G 3/3611; G09G 5/363
USPC .............. 348/333.01; 345/502, 503, 519, 520
See application file for complete search history.

(56) References Cited

U.S. PATENT DOCUMENTS

5,617,113 A 4/1997 Prince
5,629,744 A 5/1997 Kawamura
(Continued)

FOREIGN PATENT DOCUMENTS

EP 0678847 A1 10/1995
JP 07-294883 A 11/1995
(Continued)

OTHER PUBLICATIONS

The Extended European Search Report for European Patent Application No. 11166419.9 dated Dec. 23, 2011.
(Continued)

*Primary Examiner* — Yogesh Aggarwal
(74) *Attorney, Agent, or Firm* — Global IP Counselors, LLP

(57) ABSTRACT

An image-displaying device includes a storage section, an image data generation section, a timing information acquisition section, and a display control section. The image data generation section is configured to generate image data indicative of an image of a subject and output to the storage section the image data including an Nth image data and an (N+i)th image data. The timing information acquisition section is configured to acquire timing information indicative of a timing related to generation of the image data and a timing at which output of each of the Nth image data and the (N+i)th image data to the storage section is completed. The display control section is configured to control a display section to commence reading and displaying the Nth image data in accordance with acquisition of the timing information indicating that the output of the (N+i)th image data to the storage section is completed.

12 Claims, 7 Drawing Sheets

(51) Int. Cl.
*G09G 5/393* (2006.01)
*G09G 5/395* (2006.01)
*H04N 5/232* (2006.01)
*H04N 101/00* (2006.01)

(56) References Cited

U.S. PATENT DOCUMENTS

| | | |
|---|---|---|
| 6,133,900 A | 10/2000 | Esaki |
| 7,710,468 B2 | 5/2010 | Uchida et al. |
| 7,868,890 B2 | 1/2011 | Ludwin et al. |
| 2005/0052542 A1 | 3/2005 | Iwai et al. |
| 2005/0184993 A1* | 8/2005 | Ludwin et al. ............... 345/502 |
| 2007/0097104 A1 | 5/2007 | Kuroki |
| 2007/0211153 A1 | 9/2007 | Uchida et al. |
| 2008/0151070 A1 | 6/2008 | Shiozawa et al. |
| 2009/0047010 A1 | 2/2009 | Yoshida et al. |

FOREIGN PATENT DOCUMENTS

| | | |
|---|---|---|
| JP | 2001-113039 A | 4/2001 |
| JP | 2004-325821 A | 11/2004 |
| JP | 2005-073077 A | 3/2005 |
| JP | 2005-275357 A | 10/2005 |
| JP | 2007-243615 A | 9/2007 |

OTHER PUBLICATIONS

The Extended European Search Report for European Patent Application No. 11166422.3 dated Jun. 14, 2012.

* cited by examiner

IMAGE-DISPLAYING DEVICE AND DISPLAY TIMING CONTROL CIRCUIT

CROSS-REFERENCE TO RELATED APPLICATIONS

This is a continuation application of U.S. patent application Ser. No. 13/109,420 filed on May 17, 2011. This application claims priority to Japanese Patent Application No. 2010-113978 filed on May 18, 2010 and Japanese Patent Application No. 2010-214841 filed on Sep. 27, 2010. The entire disclosures of U.S. patent application Ser. No. 13/109,420 and Japanese Patent Application Nos. 2010-113978 and 2010-214841 are hereby incorporated herein by reference.

BACKGROUND

1. Technical Field

The present invention relates to an image-displaying device for displaying an image of a subject in a display section, and to a display timing control circuit.

2. Related Art

Conventional image-capturing devices are known in which an image captured by an image-capturing sensor is displayed by a liquid crystal display, and various techniques have been developed for preventing a delayed display of the image of the subject from occurring in the liquid crystal display. In Japanese Laid-Open Patent Application Publication No. 2007-243615, for example, a technique is disclosed whereby an image signal is read and displayed by a liquid crystal display before writing of the image signal of a single frame to the VRAM is completed in an image-capturing device provided with a VRAM for recording an image signal of a single frame. Specifically, a configuration is described in which image display by a liquid crystal display is started at a playback timing that is delayed by $\Delta T$ from the drive timing of the image-capturing sensor.

SUMMARY

In the technique of Japanese Laid-Open Patent Application Publication No. 2007-243615, the cycle of the drive timing and the playback timing is the cycle for processing an image of a single frame, and a constant $\Delta T$ is defined for the frames. In other words, in the technique disclosed in this publication, $\Delta T$ is described as being defined for each mode (Japanese Laid-Open Patent Application Publication No. 2007-243615, paragraph [0057]), and $\Delta T$ is determined so that reading of image data does not take place before writing thereof (Japanese Laid-Open Patent Application Publication No. 2007-243615, paragraphs [0055] and [0056]). Consequently, although $\Delta T$ may fluctuate for each mode, $\Delta T$ is a common value for each frame in the same mode, and the same phase difference $\Delta T$ is given for all lines of the image that is to be displayed.

However, in a configuration in which image processing for displaying the image of a subject in a display section is performed based on output data of an image-capturing sensor, the period needed for each type of image processing may be different for each line. Even when the image-capturing sensor and the display section are synchronized by frame units, since the image-capturing sensor and the display section usually have a different number of lines, the cycle of the lines of the image-capturing sensor and the cycle of the lines of the display section are different. Therefore, when a live view is displayed in the display section of the image-capturing device, a situation may occur in which the image data of a line are not yet prepared to a state of being displayable in the display section at the timing at which the display section attempts to display the image data of the line. In this case, since the image data of the line are not yet prepared to a state of being displayable in the display section at the aforementioned timing, different data than the image data of the line that is supposed to be displayed are displayed in the display section, and the display contents of the display section appear partially disordered.

The present invention was developed in view of the foregoing problems, and an object of the present invention is to satisfactorily display the image data when image data indicating an image of a subject generated based on output data of an image-capturing sensor are displayed in a display section.

An image-displaying device according to an aspect of the invention comprises a storage section, an image data generation section, a timing information acquisition section, and a display control section. The image data generation section is configured to perform processing for generating image data indicative of an image of a subject based on output data from an image-capturing section that captures the image of the subject, and to output the image data to the storage section with the image data including an Nth image data and an (N+i)th image data, where N is a natural number and i is a nonnegative integer. The timing information acquisition section is configured to acquire timing information indicative of a timing related to generation of the image data in the image data generation section and a timing at which output of each of the Nth image data and the (N+i)th image data to the storage section is completed. The display control section is configured to control a display section to commence reading and displaying the Nth image data in the display section in accordance with the timing information acquisition section receiving the timing information indicating the output of the (N+i)th image data from the image data generation section to the storage section is completed.

The display control section is configured to determine whether the Nth image data is a last one of the image data, and to control the display section to display the Nth image data without waiting for completion of output of the (N+i)th image data to the storage section when it is determined that the Nth image data is the last one of the image data.

An electronic apparatus comprises the image-displaying device according to the aspect of the invention.

An image-displaying device according to another aspect of the invention comprises an image-capturing section, an image data generation section, a storage section, and a display section display. The image-capturing section is configured to output capturing data of a subject. The image data generation section is configured to generate image data based on the capturing data from the image-capturing section and output a variable timing information in accordance with a generating condition of the image data. The storage section is configured to store the image data. The display section is configured to display the image data stored in the storage section. The display section is configured to display Nth image data of the image data according to the variable timing information of (N+i)th image data of the image data, where N is a natural number and i is a nonnegative integer.

The display section is configured to display the Nth image data without waiting for completion of output of the (N+i)th image data to the storage section when it is determined that the Nth image data is the last one of the image data.

An electronic apparatus comprises the image-displaying device according to the aspect of the invention.

An image-displaying control device according to another aspect of the invention comprises an image data generation section, a storage section, a timing information acquisition section, and a display control section. The image data generation section is configured to generate image data to display by a display section and outputs the image data. The storage section is configured to store the image data. A timing information acquisition section is configured to acquire a variable timing information in accordance with a generating condition of the image data in the image data generation section. The display control section is configured to control the display section to read Nth image data of the image data from the storage section according to the variable timing information of (N+i)th image data of the image data, where N is a natural number and i is a nonnegative integer.

The display section is configured to display the Nth image data without waiting for completion of output of the (N+i)th image data to the storage section when it is determined that the Nth image data is the last one of the image data.

An electronic apparatus comprises the image-displaying device according to the aspect of the invention.

An image-displaying device according to another aspect of the invention comprises a display section, an image data generation section, a storage section, and a display control section. The display section is configured to display image data. The image data generation section is configured to generate the image data and output a variable timing information in accordance with a generating condition of the image data. The storage section is configured to store the image data. The display control section is configured to control the display section to read Nth image data of the image data from the storage section according to the variable timing information of (N+i)th image data of the image data and display the Nth image data of the image data, where N is a natural number and i is a nonnegative integer.

The display section is configured to display the Nth image data without waiting for completion of output of the (N+i)th image data to the storage section when it is determined that the Nth image data is the last one of the image data.

An electronic apparatus comprises the image-displaying device according to the aspect of the invention.

BRIEF DESCRIPTION OF THE DRAWINGS

Referring now to the attached drawings which form a part of this original disclosure.

DETAILED DESCRIPTION OF EXEMPLARY EMBODIMENTS

Embodiments of the present invention will be described in the following order: (1) Configuration of the image-capturing device; (2) Control of the horizontal synchronization signal; and (3) Other embodiments.

(1) Configuration of Image-Capturing Device

Figure 1:
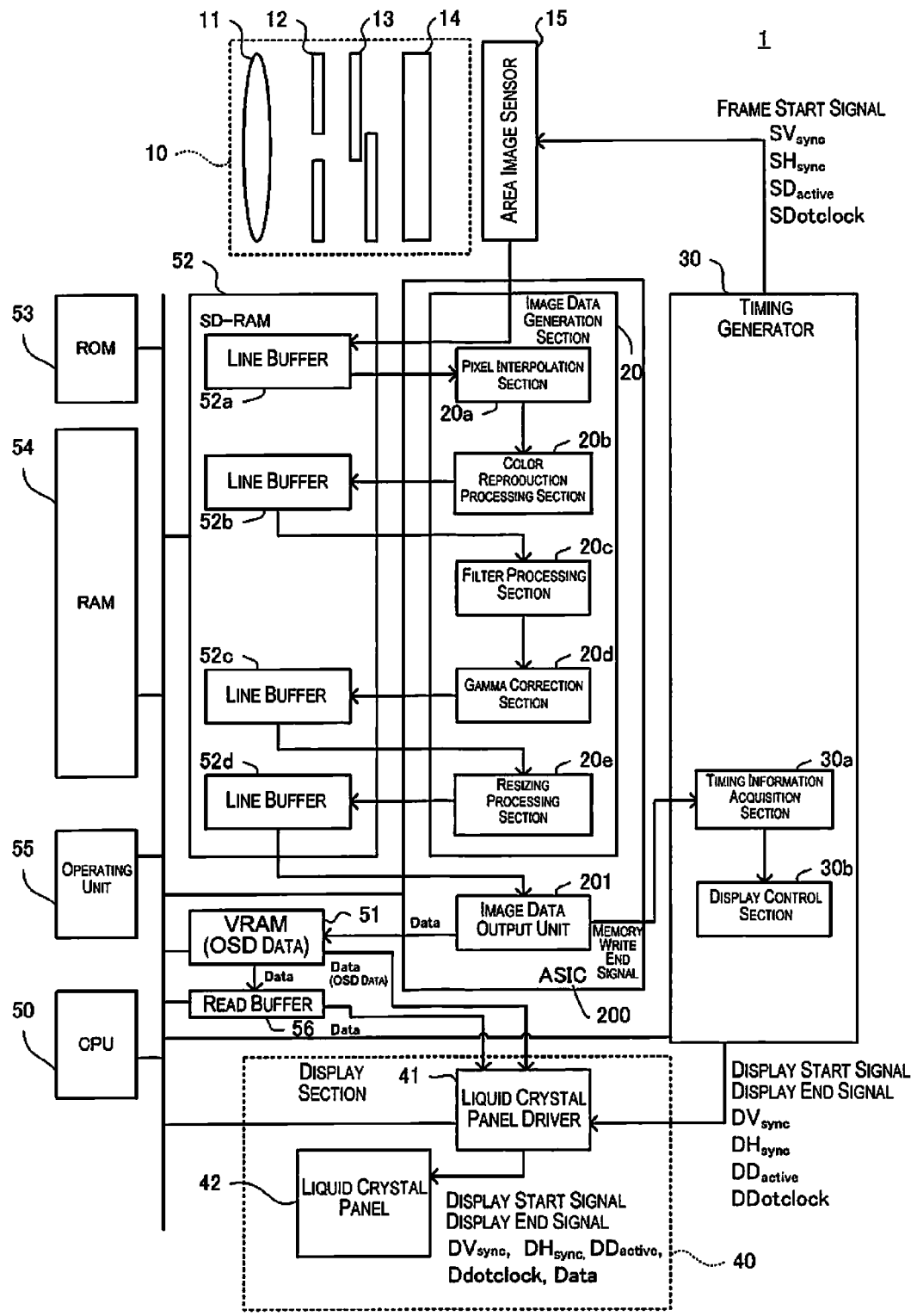
FIG. 1 is a block diagram according to an embodiment of the present invention.

The image-capturing device 1 (image-displaying device) according to an embodiment of the present invention shown in FIG. 1 is provided with an optical system 10, an area image sensor 15 (corresponding to the image-capturing section), an ASIC 200, a timing generator 30 (corresponding to the display timing control circuit), a display section 40, a CPU 50, a VRAM 51 (corresponding to the first storage section), an SD-RAM 52, a ROM 53, a RAM 54, an operating section 55, and a read buffer 56 (corresponding to the second storage section). The CPU 50 is capable of executing a program recorded in the ROM 53 by appropriately utilizing the VRAM 51, the SD-RAM 52, and the RAM 54, and through this program, the CPU 50 executes a function for generating image data which indicate a subject captured by the area image sensor 15, in accordance with an operation of the operating section 55. The operating section 55 is provided with a shutter button, a dial switch as mode switching means for switching a mode, a dial switch for switching an aperture and a shutter speed, and a push button for operating various types of setting menus, and a user can issue various types of instructions to the image-capturing device 1 by operating the operating section 55.

The display section 40 is an EVF (electronic view finder) for displaying an image indicating a subject to be captured and allowing the user to comprehend the appearance of the subject prior to the capturing of the image, and image-capturing conditions and other information, and the image-capturing device 1 according to the present embodiment is a mirrorless digital camera provided with an EVF. The display section 40 is provided with an interface circuit not shown in the drawing, a liquid crystal panel driver 41, a liquid crystal panel 42, and an eyepiece lens and other components not shown in the drawing. In the present embodiment, the liquid crystal panel 42 is a high-temperature polysilicon TFT (Thin Film Transistor) provided with three sub-pixels corresponding to three colors of color filters for each pixel, and the positions of the pixels are prescribed by coordinates in an orthogonal coordinate system. A line is composed of a plurality of pixels aligned in the direction parallel to one coordinate axis, and a plurality of lines is aligned in the direction parallel to the other coordinate axis. In the present specification, the direction parallel to the lines is referred to as the horizontal direction, the direction perpendicular to the lines is referred to as the vertical direction, and a single screen composed of all the pixels of the liquid crystal panel 42 is referred to as a single frame.

The liquid crystal panel driver 41 applies a voltage to each sub-pixel and outputs a signal for driving the liquid crystals to the liquid crystal panel 42. The liquid crystal panel 42 is provided with a gate driver and a source driver not shown in the drawing, and performs display by a process whereby the gate driver controls the display timing in each pixel of each line in accordance with the signal outputted from the liquid crystal panel driver 41, and the source driver applies a voltage that corresponds to the image data of each pixel to each pixel of a line designated by the display timing. In other words, the liquid crystal panel driver 41 is configured so as to output various types of signals for performing display in the liquid crystal panel 42, e.g., a display start signal for prescribing the timing for starting display of a single frame; a display end signal for indicating that display of a single frame is completed; a vertical synchronization signal (DVsync) for prescribing a period for displaying a single frame; a horizontal synchronization signal (DHsync) for prescribing a period for displaying a single line; a data active signal (DDactive) for prescribing a period for importing image data within each line; a data clock signal (DDotclock) for prescribing the import timing of image data of each pixel; and image data (Data) of each pixel.

The image-capturing device 1 according to the present embodiment is provided with the timing generator 30, and the vertical synchronization signal DVsync, the horizontal synchronization signal DHsync, the data active signal DDactive, the data clock signal DDotclock, the display start signal, and the display end signal are generated by the timing generator 30. In other words, the timing generator 30 is provided with a display control section 30b which is provided with a division circuit or the like for generating a signal in which the signal level varies in synchrony with the variation timing of a clock signal having a predetermined cycle outputted from a clock signal generation means. By control of the display control section 30b, the timing generator 30 generates the vertical synchronization signal DVsync, data active signal DDactive, data clock signal DDotclock, display start signal, and display end signal in which the signal levels vary at a timing determined in advance. The output timing of the horizontal synchronization signal DHsync is variable in the present embodiment, and the output timing is determined depending on the processing result of an image data output section 201, as described hereinafter.

The liquid crystal panel 42 in the present embodiment is a panel having an XGA-size pixel count provided with 1024 effective pixels in the horizontal direction and 768 effective pixels in the vertical direction, and can display gradations corresponding to the Data in any position by adjusting the content and output timing of the image data Data outputted by the liquid crystal panel driver 41. In the present embodiment, a configuration is adopted in which an image of the subject is displayed based on the output data of the area image sensor 15 in a subject image display region of the liquid crystal panel 42 determined in advance, and characters indicating image-capturing conditions or other information are displayed in an information display region outside the subject image display region. In other words, characters indicating image-capturing conditions or other information are displayed as an OSD (on-screen display) together with the image of the subject in the liquid crystal panel 42. The liquid crystal panel 42 is provided with a large number of pixels in excess of the effective pixels in the horizontal direction and the vertical direction, but in order to simplify the present specification, no description is given of the processing that relates to pixels other than the effective pixels.

The optical system 10 is provided with a lens 11 for forming a subject image on the area image sensor 15, and an aperture 12, a shutter 13, and a low-pass filter 14. Among these components, the lens 11 and the aperture 12 are replaceably attached to a chassis not shown in the drawing. A CMOS (complementary metal oxide semiconductor) image sensor, CCD (charge coupled device) image sensor, or other solid image-capturing element provided with color filters arranged in a Bayer array, and a plurality of photodiodes for accumulating a charge according to a quantity of light by photoelectric conversion for each pixel is used as the area image sensor 15. The positions of the pixels of the area image sensor 15 are prescribed by coordinates in an orthogonal coordinate system, wherein a line is composed of a plurality of pixels aligned in the direction parallel to one coordinate axis, and a plurality of lines is aligned in the direction parallel to the other coordinate axis. In the present specification, the direction parallel to the lines is referred to as the horizontal direction, the direction perpendicular to the lines is referred to as the vertical direction. A single screen composed of all the pixels of the area image sensor 15 is referred to as a single frame.

In the present embodiment, the area image sensor 15 also operates in synchrony with the various types of signals outputted by the timing generator 30. In other words, the timing generator 30 outputs a frame start signal for prescribing the start timing of processing of a single frame; a vertical synchronization signal (SVsync) for prescribing a period for reading the detection results of the photodiodes for a single frame; a horizontal synchronization signal (SHsync) for prescribing a period for reading the detection results of the photodiodes for a single line; and a data clock signal (SDotclock) for prescribing the read timing and the like of image data of each pixel. The area image sensor 15 starts outputting the output data for a single frame in accordance with the vertical synchronization signal SVsync, and sequentially reads output data which indicate the detection results of the photodiodes corresponding to a portion of the pixels of the area image sensor 15 at a timing in accordance with the data clock signal SDotclock within the period prescribed by the horizontal synchronization signal SHsync.

The ASIC 200 is provided with an image data generation section 20 which is composed of a circuit for performing processing whereby line buffers 52a through 52d for a plurality of lines reserved in advance in the SD-RAM 52 are utilized, and image data for displaying an image of the subject in the display section 40 are generated by pipeline processing. The line buffers 52a through 52d for a plurality of lines may also be provided to the image data generation section 20 or another component. The display section 40 displays the subject on the liquid crystal panel 42 based on the generated image data. In other words, the user can confirm the subject while utilizing the display section 40 as an EVF. The ASIC 200 may also be an image processing DSP (digital signal processor).

In a case in which the user operates the operating section 55 to issue an image capture instruction, in response to the image capture instruction, the area image sensor 15 starts outputting the output data for a single frame in accordance with the vertical synchronization signal SVsync, and sequentially reads the output data which indicate the detection results of the photodiodes corresponding to all of the effective pixels of the area image sensor 15 at a timing in accordance with the data clock signal SDotclock within the period prescribed by the horizontal synchronization signal SHsync. The image data generation section 20 then utilizes the SD-RAM 52 or another component to generate image data in a JPEG format or other format, and the image data are recorded in a removable memory or the like not shown in the drawing. In other words, the user can generate image data for indicating the subject.

(2) Control of Horizontal Synchronization Signal

Figure 2:
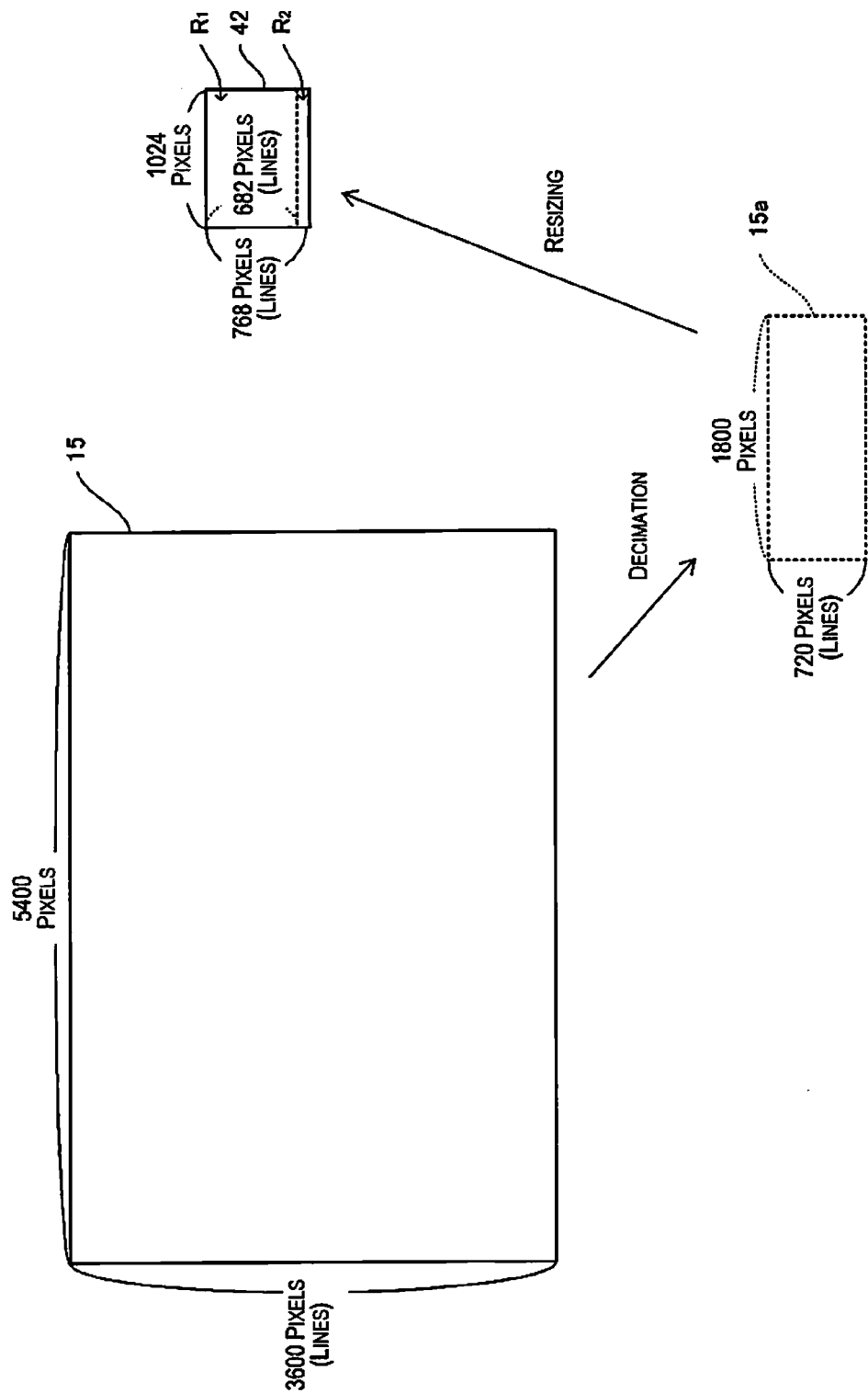
FIG. 2 is a diagrammatic view showing the number of pixels of the area image sensor and the liquid crystal panel.

In a case in which image data indicating a subject are recorded in the removable memory or the like, and printing or another operation is considered, the number of pixels of the area image sensor 15 must be greater than a predetermined number in order to obtain high-quality image data. Therefore, the effective number of pixels of the area image sensor 15 in the present embodiment is 5400 pixels in the horizontal direction and 3600 pixels in the vertical direction, as shown in FIG. 2. The area image sensor 15 is provided with a large number of pixels in excess of the effective pixels in the horizontal direction and the vertical direction, but in order to simplify the present specification, no description is given of the processing that relates to pixels other than the effective pixels.

On the other hand, the liquid crystal panel 42 is provided with 1024 pixels in the horizontal direction and 768 pixels in the vertical direction, as described above, and is configured so that the image of the subject is displayed in the subject image display region (R1 shown in FIG. 2). In the present embodiment, in order to display the image of the subject as large as possible while maintaining the aspect ratio (2:3) of the area image sensor 15, a rectangular region having an aspect ratio of 2:3 in which the top edge and left and right edges are adjacent to the top edge and left and right edges of the liquid crystal panel 42 is used as the subject image display region R1 for displaying the image of the subject. The remaining region is the information display region (region shown in FIG. 2) for displaying characters indicating image-capturing conditions or other information. Consequently, the subject image display region R1 in the liquid crystal panel 42 is composed of 1024 pixels in the horizontal direction and 682 pixels in the vertical direction. As described above, the number of pixels of the area image sensor 15 and the number of pixels of the liquid crystal panel 42 are not the same in the present embodiment.

Furthermore, since the display in the display section 40 is utilized by the user to confirm the subject, when the delay between the timing at which the subject is captured by the area image sensor 15 and the timing at which the image of the captured subject is displayed by the display section 40 increases sufficiently to be noticeable by the user, the subject seen in the EVF and the recorded image of the subject are misaligned, and the EVF becomes extremely difficult to use. The delay must therefore be minimal when the display section 40 is used as an EVF.

Therefore, in order for the image captured by the area image sensor 15 to be displayed in the display section 40 so that the delay is so extremely short as to be seen by the human eye, a configuration is adopted in the present embodiment whereby various types of processing are performed by the area image sensor 15 and the image data generation section 20, and the display section 40 causes the image data generated as a result of the processing to be displayed at high speed.

In other words, the area image sensor 15 according to the present embodiment is provided with a circuit capable of executing interlaced scanning for reading the detection results of the photodiodes at a ratio of 1 for every n (where n is an odd number) lines aligned in the vertical direction. An adder is also provided for adding m (where m is a natural number) detection results aligned in the horizontal direction among the photodiodes for performing photoelectric conversion via color filters of the same color, and outputting 1/m of the sum (i.e., outputting the arithmetic average of the m detection results). The present embodiment is configured so that when the display section 40 is caused to function as an EVF, interlaced scanning and processing by the adder are executed in the area image sensor 15, whereby pixels in the horizontal direction and the vertical direction are skipped, and the output data of a smaller number of pixels than the number of pixels provided to the area image sensor 15 are outputted, and the subject can thereby be captured at high speed.

Figure 3:
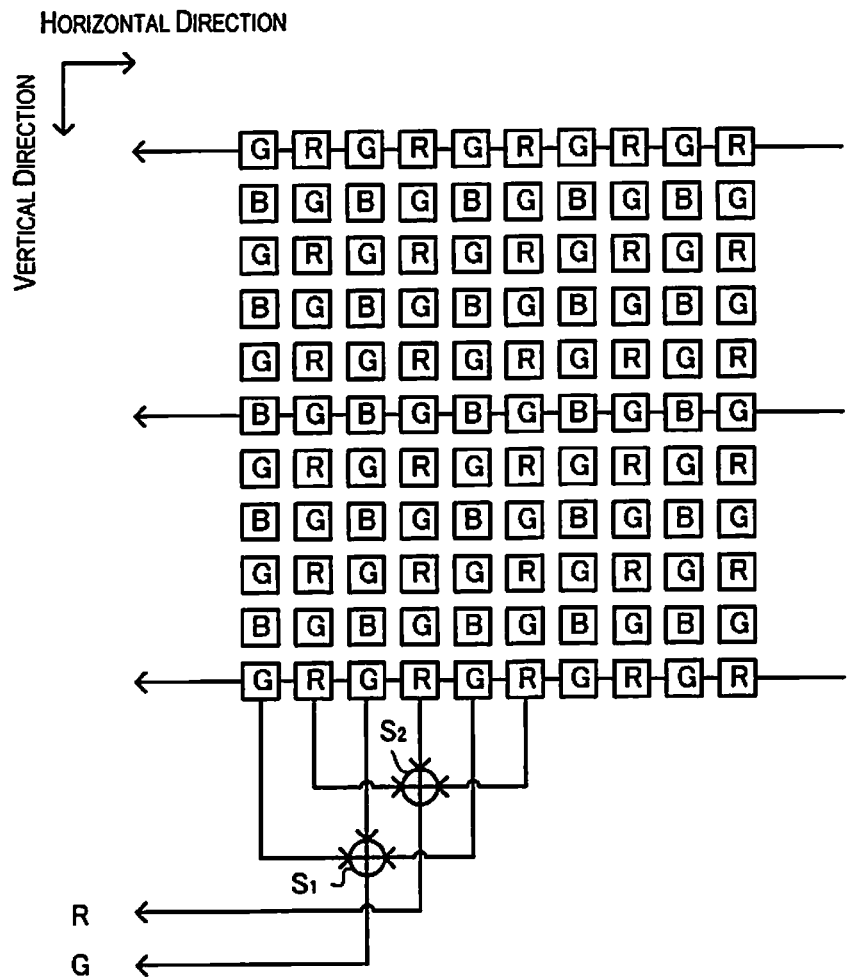
FIG. 3 is a view showing an example of the method for outputting the output data of the area image sensor.

In other words, in a live view mode for causing the display section 40 to function as an EVF, the area image sensor 15 reads for lines in the vertical direction at a ratio of 1 for every n lines in accordance with the horizontal synchronization signal SHsync. Processing for outputting the result of arithmetically averaging the detection results of m photodiodes by the adder is also performed in accordance with the data clock signal SDotclock. FIG. 3 shows an example of the method for outputting the output data of a smaller number of pixels than the number of pixels provided to the area image sensor 15 in the present embodiment. In FIG. 3, the rectangles labeled R indicate photodiodes that correspond to color filters for transmitting light in a red spectrum, the rectangles labeled G indicate photodiodes that correspond to color filters for transmitting light in a green spectrum, and the rectangles labeled B indicate photodiodes that correspond to color filters for transmitting light in a blue spectrum.

As shown in FIG. 3, in a case in which the color filters of the pixels indicated by rectangles are in a Bayer array, since a color filter of only one color corresponds to each pixel, the color of each pixel must be interpolated by utilizing the surrounding pixels. Therefore, lines are decimated to acquire the output data, decimation must be performed so that the color filters of adjacent lines after decimation are of a different color. Therefore, in the present embodiment, by acquiring the detection values in the photodiodes of each line at a ratio of 1 line for every n lines (where n is an odd number) as the output data, it is possible to acquire output data in which the color of each pixel can be specified by interpolation. In the present embodiment, a configuration is adopted in which the output data are acquired at a ratio of 1 line for every 5 lines in order to make the number of lines in the vertical direction of the area image sensor 15 as close as possible to the number of lines in the vertical direction of the subject image display region R1 of the liquid crystal panel 42. In FIG. 3, the left-directed arrows indicate that output data are acquired at a ratio of 1 line for every 5 lines, and in this example, the number of lines in the vertical direction is ⅕, i.e., 720.

In a case in which the color filters are in a Bayer array, the colors of adjacent pixels in the horizontal direction are different, and the same color of color filter occurs at every other position. Therefore, decimation processing can essentially be performed by adding m at every other pixel for pixels aligned in the horizontal direction and multiplying the sum by 1/m (i.e., calculating the arithmetic average of m detection results). In the present embodiment, m is set to 3, due to such factors as limitations for the sake of image quality in cases in which adding is performed by the adder. In the configuration shown in FIG. 3, in the lowest line shown, the detection results of the three photodiodes aligned in the horizontal direction that are photodiodes for performing photoelectric conversion via green color filters are added by an adder S1 and multiplied by ⅓, and the detection results of the three photodiodes aligned in the horizontal direction that are photodiodes for performing photoelectric conversion via red color filters are added by an adder S2 and multiplied by ⅓. In this example, the number of pixels in the horizontal direction is ⅓, i.e., 1800 pixels. In FIG. 2, the data size after decimation in the area image sensor 15 is indicated by the dashed-line rectangle 15a.

As described above, in the area image sensor 15, the number of lines in the vertical direction may be set to 720, and the number of pixels in the horizontal direction may be set to 1800. However, in such decimation, because of n being an odd number in the vertical direction, m being a natural number in the horizontal direction, and other such limitations for the sake of image quality, the number of pixels after decimation and the number of pixels of the subject image display region R1 of the liquid crystal panel 42 do not readily coincide. In a case in which n and m differ, as described above, the aspect ratio differs between the subject and the subject image on the liquid crystal panel 42.

A configuration is therefore adopted in the present embodiment in which resizing is further performed in the image data generation section 20 for the decimated output data, and image data are generated for display in the subject image display region R1 of the liquid crystal panel 42. In other words, the image data generation section 20 is provided with a pixel interpolation section 20*a*, a color reproduction processing section 20*b*, a filter processing section 20*c*, a gamma correction section 20*d*, and a resizing processing section 20*e*. In this configuration, the number of pixels in the vertical direction and the horizontal direction is modified by the resizing processing section 20*e* in the process of generating the image data, and image data are generated which are equivalent to the number of pixels of the subject image display region R1 of the liquid crystal panel 42.

The line buffer 52*a* is a buffer memory for temporarily recording the decimated output data outputted from the area image sensor 15, and when the decimated output data are outputted from the area image sensor 15, the output data are temporarily recorded in the line buffer 52*a* by the processing of the image data generation section 20. The pixel interpolation section 20*a* imports data of the necessary number of pixels for generating the colors of the two channels missing in each pixel in the Bayer array from the line buffer 52*a*, and while doing so, generates the colors of the two channels by interpolation processing. As a result, three channels of data are generated in each pixel. The color reproduction processing section 20*b* then performs color conversion processing for color matching by performing a 3×3 matrix computation based on the generated data. The data generated by color conversion processing are temporarily recorded in the line buffer 52*b*. The filter processing section 20*c* then executes sharpness adjustment, noise removal processing, and other processing by filter processing. The gamma correction section 20*d* then executes gamma correction to compensate for a characteristic difference between the colors indicated by the gradation values of the output data of the area image sensor 15 and the colors indicated by the gradation values of the image data handled by the display section 40. The data generated by gamma correction are temporarily recorded in the line buffer 52*c*.

The data recorded for each line, i.e., line by line, in the line buffer 52*c* are the number of pixels decimated in the area image sensor 15. In other words, data of 720 lines in the vertical direction and 1800 pixels in the horizontal direction are recorded line by line. The resizing processing section 20*e* performs resizing by sequentially referencing the data recorded in the line buffer 52*c* to perform interpolation computation processing and specify the gradation value of each channel in the positions between pixels. In the present embodiment, since the decimation in the area image sensor 15 described above is ⅕ in the vertical direction and ⅓ in the horizontal direction, the aspect ratio of the decimated data differs from the aspect ratio of the output data of the area image sensor 15, as shown in the rectangle 15*a* in FIG. 2. Therefore, the resizing processing section 20*e* first performs reduction processing for reduction to a size of approximately 57% in the horizontal direction based on the data recorded in the line buffer 52*c*. As a result, the number of pixels in the horizontal direction is set to 1024. The resizing processing section 20*e* also performs reduction processing for reduction to a size of approximately 95% in the vertical direction. As a result, image data are generated for which there are 1024 pixels in the horizontal direction and 682 lines in the vertical direction. The generated image data are recorded line by line in the line buffer 52*d*.

In the present embodiment, by the processing described above, generation processing is performed for generating image data that can be displayed in the subject image display region R1 of the liquid crystal panel 42 based on the output data of the area image sensor 15, but the output data of the area image sensor 15 have 720 lines in the vertical direction, whereas the number of lines of the image data in the vertical direction is 682, and the number of lines of the liquid crystal panel 42 in the vertical direction is 768. In other words, different numbers of lines are required to capture a single frame and to display a single frame.

Therefore, in the present embodiment, the frame start signal, the horizontal synchronization signal SHsync, the vertical synchronization signal SVsync, the data active signal SDactive, and the data clock signal SDotclock of the area image sensor 15 are set to the cycle necessary for driving the area image sensor 15. In other words, the timing generator 30 outputs the horizontal synchronization signal SHsync the number of times and at the timing whereby the decimation in the vertical direction such as described above can be performed in the area image sensor 15, and the output data of the number of lines of a single frame can be acquired within the period prescribed by the vertical synchronization signal SVsync. The timing generator 30 also outputs the data clock signal SDotclock the number of times and at the timing whereby decimation in the horizontal direction such as described above can be performed, and the output data of the number of pixels of a single line can be acquired within the period prescribed by the horizontal synchronization signal SHsync.

The image data output section 201, the VRAM 51, the read buffer 56, a timing information acquisition section 30*a*, and the display control section 30*b* are provided in order to produce a display in the liquid crystal panel 42 based on the output data outputted line by line from the area image sensor 15. The VRAM 51 is capable of accumulating the image data of at least a single frame. Since the VRAM 51 is accessed by various processing sections, time may be taken before the image data can actually be acquired when the VRAM 51 is accessed at the timing at which the display section 40 attempts to display the image data. Therefore, in the present embodiment, the transfer of image data between the VRAM 51 and the display section 40 is performed via the read buffer 56. The image data output section 201 outputs the image data (Data) recorded in the line buffer 52*d* to the VRAM 51 line by line. At the time that outputting of the image data to the VRAM 51 is completed, the image data output section 201 outputs a memory write end signal (corresponding to the timing information) to the timing information acquisition section 30*a*. The read buffer 56 reads the image data in advance from the VRAM 51 at a timing described hereinafter, and accumulates the image data. The image data are then read line by line, one line at a time, from the read buffer 56 by the liquid crystal panel driver 41 at the timing (horizontal synchronization signal DHsync) instructed from the display control section 30*b*. As a result, the image of the subject captured by the area image sensor 15 is displayed in the subject image display region R1 (lines 1 through 682 of the liquid crystal panel 42). The CPU 50 records OSD data to the VRAM 51 prior to at least display in an information display region R2. During display in lines 683 through 768 of the liquid crystal panel 42, the OSD data recorded in the VRAM 51 are read line by line from the liquid crystal panel driver 41 as the Data. As a result, characters indicating image-capturing conditions and the like are displayed in the information display region R2.

The read buffer 56 in the present embodiment is capable of accumulating image data of a single line. In a state in which image data have been accumulated to the upper limit of the size of the read buffer 56, e.g., in a state in which the read buffer 56 is filled with the $N^{th}$ line of image data, the read buffer 56 does not acquire the image data of the $(N+1)^{th}$ line from the VRAM 51 even when image data of the $(N+1)^{th}$ line and subsequent lines are outputted to the VRAM 51. When the display section 40 begins to read image data from the read buffer 56 in a state in which image data are accumulated in the read buffer 56, the read buffer 56 acquires and accumulates the same amount of new image data from the VRAM 51 as is read. Specifically, when image data begin to be read in a state in which the read buffer 56 is filled with the Nth line of image data, for example, the read buffer 56 acquires and accumulates the image data of the $(N+1)^{th}$ line from the VRAM 56 the same amount at a time as is read. When the read buffer 56 accumulates the image data of the first line from an empty state, the image data are acquired and accumulated in the read buffer 56 the same amount at a time as is outputted to the VRAM 51 when outputting of the image data of the first line to the VRAM 51 begins.

As described above, the read buffer 56 acquires image data from the VRAM 51, and image data are read from the display section 40.

Using FIG. 4A, an example will next be described of a case in which an attempt is made to start display of the $N^{th}$ line without waiting for outputting of the $(N+1)^{th}$ line to the VRAM 51 to be completed after outputting of the image data of the $N^{th}$ line to the VRAM 51 is completed. In FIG. 4, and in FIG. 5 described hereinafter, "VRAM(LiveViewData)" indicates the output timing of image data which are generated by the image data generation section 20 based on the output data from the area image sensor 15 and outputted one line at a time to the VRAM 51 by the image data output section 201, and a signal having such a waveform is not necessarily actually generated. The numbers indicate lines, the rising indicates the timing of the start of output to the VRAM 51, and the falling indicates the timing of completion of output. The image data outputted to the VRAM 51 are accumulated in the VRAM 51 without modification unless overwriting with other data, resetting, or the like is particularly performed. A breakdown of the data accumulated in the read buffer 56 is shown as a time series in the "Read buffer" portion of each drawing. The upper left end of the square indicates the timing of the start of accumulation, the lower left end indicates the timing of completion of accumulation, the upper right end indicates the timing of the start of reading, and the lower right end indicates the timing of completion of reading.

Figure 4A:
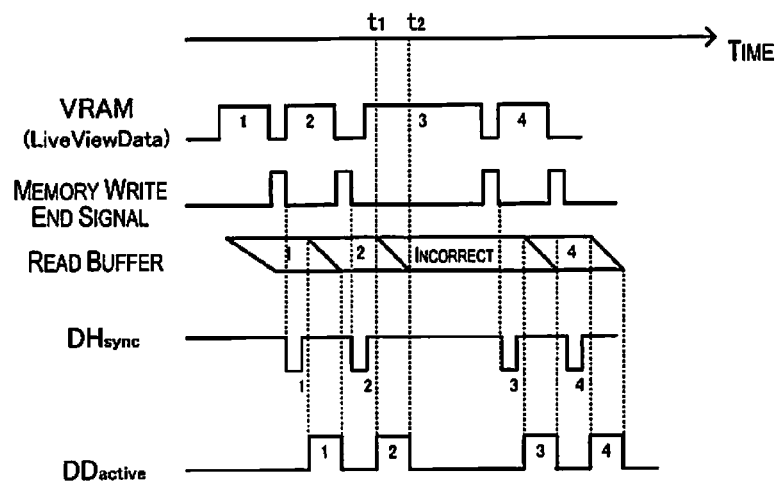
FIG. 4A is a timing chart showing one example of an embodiment of the present invention.

As shown in FIG. 4A, when outputting of the image data of the first line to the VRAM 51 is started, the read buffer 56 begins to accumulate the image data of the first line the same amount at a time as is outputted to the VRAM 51. When outputting of the image data of the first line to the VRAM 51 is completed, the memory write end signal is outputted by the image data output section 201. (In the present embodiment, the memory write end signal is composed of one pulse in which a low-level output is maintained in the process in which processing for generating the image data of a single line is executed, and a high level occurs for a predetermined period when the processing for generating the image data of a single line is ended and the image data are outputted to the VRAM 51.) When outputting of the image data of the first line to the VRAM 51 is completed, accumulation of the image data of the first line in the read buffer 56 is also completed. In the present embodiment, since the size of the read buffer 56 is one line of image data, the read buffer 56 at this time is in a state in which image data are accumulated to the upper limit. In the example shown in FIG. 4, after the memory write end signal of the first line is outputted, the horizontal synchronization signal DHsync for starting display of the image data of the first line is outputted without waiting for outputting of the image data of the second line to the VRAM 51 to be completed. Since reading of the image data of the first line is started at the rising timing of the data active signal DDactive of the first line, accumulation in the read buffer 56 is started for the image data of the second line, the same amount thereof at a time as is read. Since reading of the image data of the first line from the read buffer 56 ends at the falling timing of the DDactive of the first line, accumulation of the second line in the read buffer 56 is completed at the same timing (the read buffer 56 at this time is in the state of being filled with the image data of the second line). Subsequently, the start of reading of the second line to the read buffer 56 is synchronized with the rising (t1) of the DDactive of the second line, and the end of reading of the second line to the read buffer 56 is synchronized with the falling of the DDactive of the second line. Accordingly, the start of accumulation of the image data of the third line in the read buffer 56 is synchronized with the rising timing t1 of the DDactive of the second line, and the end of accumulation of the third line in the read buffer 56 is synchronized with the falling timing t2 of the DDactive of the second line. However, in a case in which more than the normal amount of time is required for the processing for generating the image data of the third line, as shown in FIG. 4, outputting of the image data of the third line to the VRAM 51 may not yet be completed at timing t2. In this case, incorrect data which are not the image data of the third line are acquired from the VRAM 51 and accumulated in the read buffer 56.

Figure 4B:
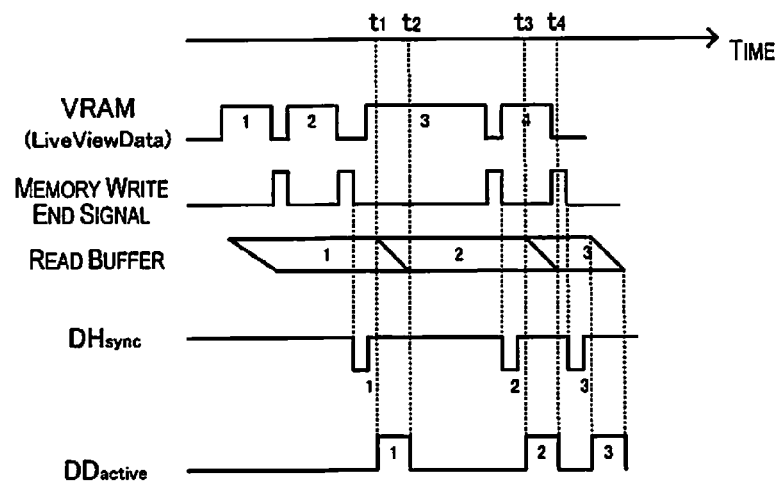
FIG. 4B is a timing chart according to another example of the embodiment of the present invention.
Figure 5:
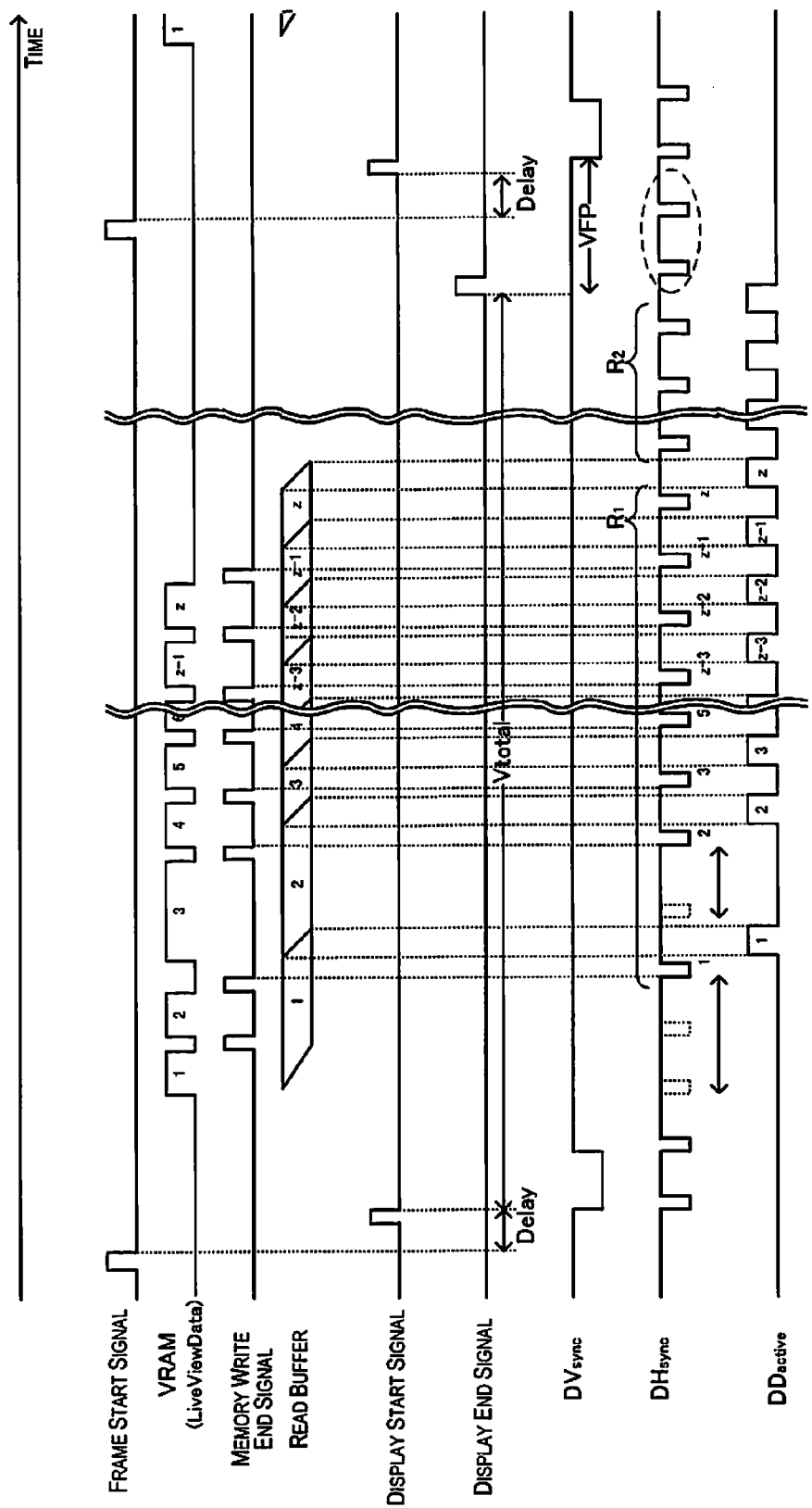
FIG. 5 is a timing chart according to the embodiment of the present invention.

Therefore, in another example of the embodiment, the image data of the $N^{th}$ line are read and displayed after outputting of the image data of the $(N+1)^{th}$ line is completed. The timing information acquisition section 30a counts the number of outputs of the memory write end signal as memory output timing information within a single frame, and it is thereby possible to specify the line number of image data for which outputting to the VRAM 51 is completed. The display control section 30b is configured so as to output the horizontal synchronization signal DHsync for starting the display of the $N^{th}$ line, after outputting of the image data of the $(N+1)^{th}$ line to the VRAM 51 is completed. In other words, as shown in FIG. 4B, at the time (t1) that reading of the image data of the first line from the read buffer 56 is started (i.e., the start of accumulation of the image data of the second line in the read buffer 56), outputting of the image data of the second line to the VRAM 51 is already completed. Outputting of the image data of the third line to the VRAM 51 is already completed as well at the time (t3) that reading of the image data of the second line from the read buffer 56 is started (i.e., the start of accumulation of the image data of the third line in the read buffer 56). This is because a configuration is adopted in which accumulation of the image data of the $(N+1)^{th}$ line in the read buffer 56 starts at the timing at which display of the $N^{th}$ line is started, and the horizontal synchronization signal DHsync for displaying the $N^{th}$ line is generated after the memory write end signal of the $(N+1)^{th}$ line.

Figure 6:
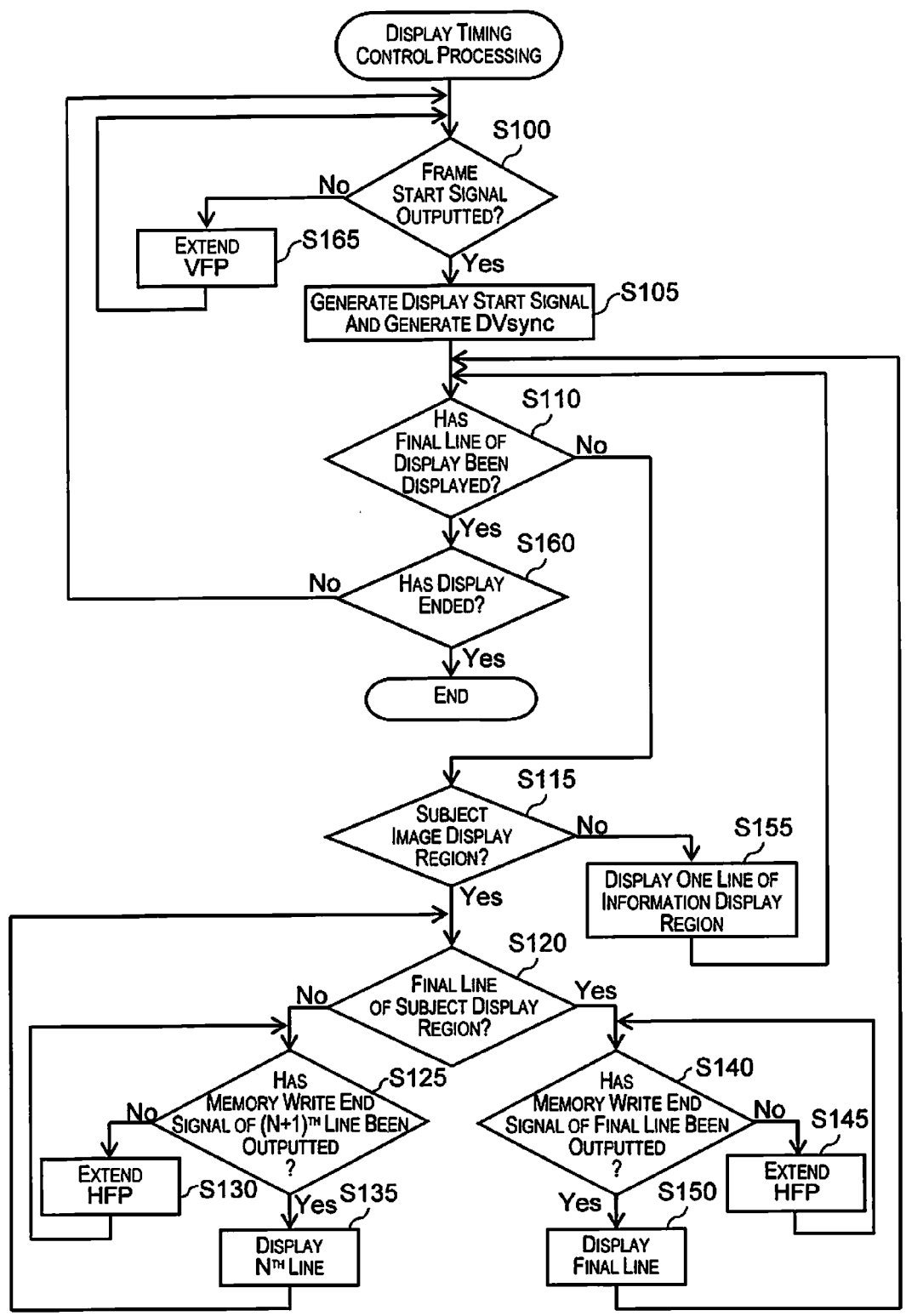
FIG. 6 is a flowchart showing the display timing control processing according to the embodiment of the present invention.

FIG. 6 is a flowchart showing the display timing control processing in the present embodiment according to FIG. 4B. The processing particulars relating to FIG. 6 will be described using the timing chart of FIG. 5. First, the timing information acquisition section 30a determines whether the frame start signal has been generated (step S100). When a frame start signal is generated, the display control section 30b generates the display start signal after a predetermined delay period Delay has elapsed, and generates the vertical synchronization signal DVsync after generating the display start signal (step S105). The frame start signal is a signal outputted to the area image sensor 15 by the timing generator 30, and the frame start signal triggers the area image sensor 15 to generate the vertical synchronization signal SVsync and start outputting the output data of a new frame. In other words, the timing generator 30 outputs the vertical synchronization signal DVsync of the display section 40 after a predetermined period from the timing at which the vertical synchronization signal SVsync of the area image sensor 15 is outputted. As a result, the cycles of the vertical synchronization signals SVsync, DVsync are the same and constant in the present embodiment. Consequently, the display in the liquid crystal panel 42 of the subject captured by the area image sensor 15 is not delayed by the period of a single frame or longer, and a display of an image of the subject captured at the same timing does not remain on the liquid crystal panel 42 for a period of a plurality of frames.

The display control section 30b then determines whether the final line of display of the liquid crystal panel 42 has been displayed (step S110). The final line of display of the liquid crystal panel 42 in the present embodiment is the final line ($768^{th}$ line) of the liquid crystal panel 42 (see FIG. 2) composed of the subject image display region R1 and the information display region R2. In a case in which the final line of display has not been displayed, the display control section 30b determines whether the next line to be displayed is a line of the subject image display region R1 (step S115). In a case in which the next line to be displayed is a line belonging to the subject image display region R1, the display control section 30b determines whether the next line to be displayed is the final line in the subject image display region R1 (step S120).

In a case in which the next line to be displayed is not the final line in the subject image display region R1, the timing information acquisition section 30a determines whether the memory write end signal has been outputted, which indicates that outputting of the image data of the $(N+1)^{th}$ line (where the $N^{th}$ line is the next line to be displayed) to the VRAM 51 is completed (step S125), and until the write end signal is outputted, the display control section 30b extends a front porch period HFP of the horizontal direction (step S130). In other words, the period until the next horizontal synchronization signal DHsync is outputted is extended.

When the memory write end signal of the $(N+1)^{th}$ line is outputted, the display control section 30b generates the horizontal synchronization signal DHsync and starts display of the $N^{th}$ line (step S135). As shown in the relationship between "VRAM(LiveViewData)," "Memory write end signal," and "Read buffer" in FIGS. 4B and 5, since the start of accumulation of the image data of the $(N+1)^{th}$ line in the read buffer 56 occurs after outputting of the image data of the $N^{th}$ line to the VRAM 51 is completed, there is no accumulation of incorrect data in the read buffer 56, as in the example shown in FIG. 4. Consequently, incorrect data are not displayed in the subject image display region R1 of the liquid crystal panel 42. Through the present embodiment thus configured, it is possible to prevent the image from being disordered when the image data indicating the image of the subject that are generated based on the output data of the area image sensor 15 are displayed in the liquid crystal panel 42.

In a case in which the next line N to be displayed is the final line of the subject image display region R1, the timing information acquisition section 30a determines whether the memory write end signal of the final line has been outputted (step S140). In a case in which the memory write end signal has not been outputted, the front porch period HFP of the horizontal direction is extended (step S145). In a case in which the memory write end signal has been outputted, the horizontal synchronization signal DHsync is generated and the final line is displayed (step S150). As a result, it is possible to avoid a situation in which the image data of the final line can no longer be displayed, due to the process waiting for completion of the outputting of image data of the final line and subsequent lines to the VRAM 51, regardless of the fact that no more image data of the final line and subsequent lines of the subject image display region R1 are outputted to the VRAM 51 in the frame.

After display of the final line of the subject image display region R1 is ended, in a case in which the next line to be displayed is not in the subject image display region R1 (the case of the "No" determination of step S115), i.e., in a case in which the next line to be displayed is in the information display region R2, the display control section 30b generates the horizontal synchronization signal DHsync and causes one line of the information display region R2 to be displayed (step S155). After one line at a time of the information display region R2 is displayed, in a case in which the final line of display of the liquid crystal panel 42 has been displayed (the case of the "Yes" determination of step S110), the display control section 30b determines whether to end display on the liquid crystal panel 42 (step S160). In a case in which display on the liquid crystal panel 42 is ended (the case of the "Yes" determination of step S160), the display timing control processing is ended.

In a case in which display on the liquid crystal panel 42 is not ended (the case of the "No" determination of step S160), the display control section 30b extends a front porch period VFP of the vertical direction until the frame start signal of the next frame is generated (step S165). The display control section 30b generates the horizontal synchronization signal DHsync during the front porch period VFP of the vertical direction (see the elliptical region surrounded by a dashed line in FIG. 5). In the Vtotal period from the display start signal to the display end signal, the display control section 30b generates the number of horizontal synchronization signals DHsync that corresponds to all of the lines displayed in the screen of the liquid crystal panel 42.

The method will next be described whereby the frame is synchronized between the area image sensor 15 and the display section 40 in a case in which the output of the horizontal synchronization signal DHsync is delayed by extending the front porch period HFP of the horizontal direction in S130 (and S145) of the display timing control processing described above. Since the liquid crystal panel 42 is preferably capable of displaying the pixels of each line of the liquid crystal panel 42 within the horizontal synchronization period prescribed by the output timing of the horizontal synchronization signal DHsync, the timing generator 30 outputs the data active signal DDactive and the data clock signal DDotclock so that the pixels of a single line can be displayed within a period assumed to be the period in which the horizontal synchronization period prescribed by the output timing of the horizontal synchronization signal DHsync is shortest.

Since the horizontal synchronization period prescribed by the horizontal synchronization signal DHsync of the liquid crystal panel 42 is of variable length in the present embodiment, the cycles of the vertical synchronization signals SVsync, DVsync are the same and constant even when the horizontal synchronization period varies. Specifically, by lengthening or shortening the horizontal synchronization period with respect to a reference period TH determined in advance, the timing generator 30 cancels out the time fluctuation from a reference period TH, and thereby controls the output signal so that the vertical synchronization period for displaying a single frame is constant. The reference period TH is configured as the horizontal synchronization period in a case in which each of the total number of lines of the liquid crystal panel 42 is displayed for an equal period within the vertical synchronization period.

In the subject image display region R1, a state is attained in which the horizontal synchronization period can be lengthened by waiting to output the horizontal synchronization signal DHsync until the processing for generating the image data of each line is ended. In the information display region R2 of the liquid crystal panel 42 for displaying characters indicating image-capturing conditions or other information, the horizontal synchronization period is made shorter than the reference period TH so as to cancel out the cumulative total of the difference of the horizontal synchronization period lengthened in the subject image display region R1 and the reference period TH.

Figure 7:
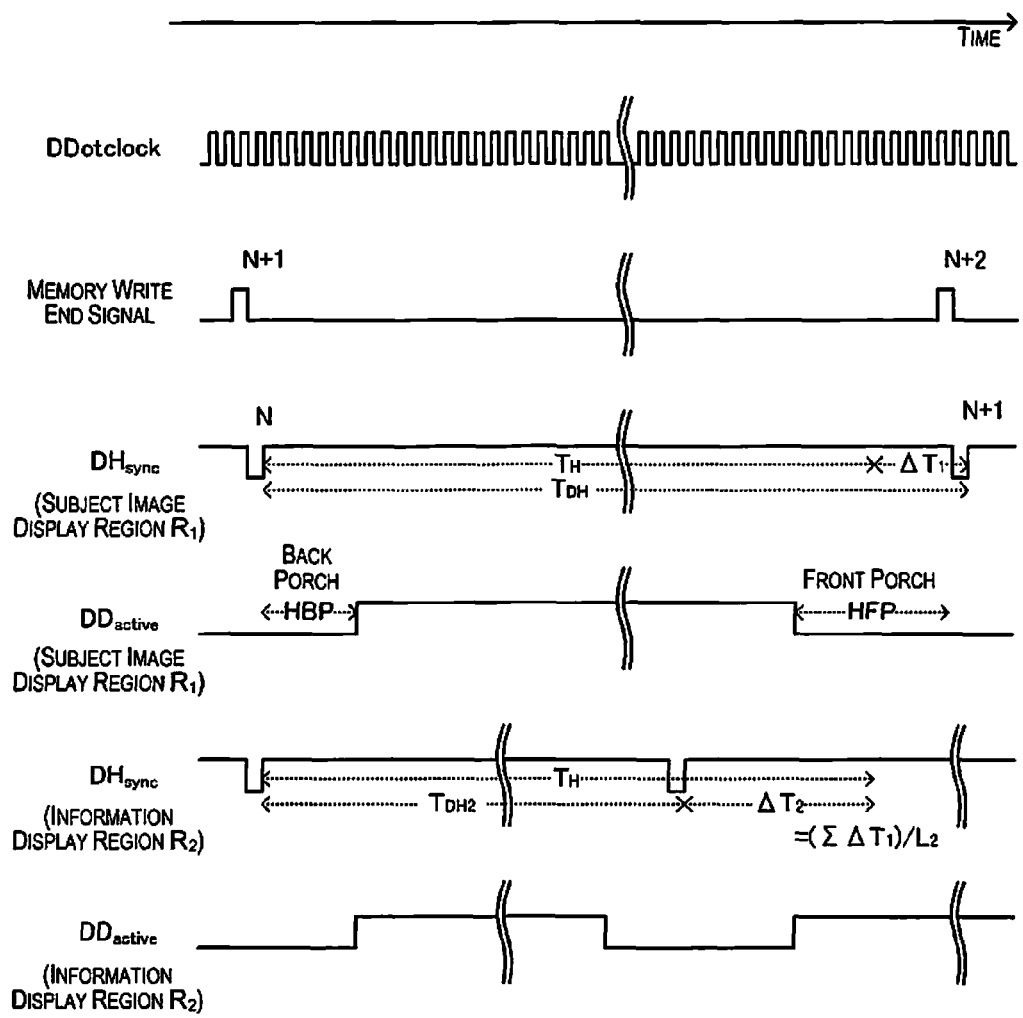
FIG. 7 is a timing chart according to the embodiment of the present invention.

FIG. 7 shows the horizontal synchronization signal DHsync outputted from the timing generator 30 configured as described above according to the example of FIG. 4B, and also shows the data active signal DDactive, the data clock signal DDotclock, and the memory write end signal. When the timing generator 30 acquires the memory write end signal through the timing information acquisition section 30a, the horizontal synchronization signal DHsync is outputted in synchrony with the pulse of the memory write end signal by the processing of the display control section 30b. Therefore, even in a case in which the processing for generating the image data of a certain line fails to occur within the reference period TH, the horizontal synchronization signal DHsync is not outputted until the processing for generating the image data is ended and outputting to the VRAM 51 is completed, and a horizontal synchronization period TDH becomes longer than the reference period TH (the front porch period HFP is extended). Consequently, in a case in which the processing for generating the image data of a certain line fails to occur within the reference period TH, display of the certain line is not started in the liquid crystal panel 42 until the processing for generating the image data is completed. Display is also not performed before preparation of the image data of each line is ended. Furthermore, since the horizontal synchronization signal DHsync is outputted when the processing for generating the image data of the (N+1)$^{th}$ line is ended and outputting of the image information to the VRAM 51 is completed, the image data of the N$^{th}$ line is displayed without delay. As described above, since the liquid crystal panel 42 in the present embodiment is driven in a state in which the horizontal synchronization period TDH may be longer than the reference period TH, the present invention is suitable for application to a situation in which the period for generating the image data of a single line to be displayed by the liquid crystal panel 42 may fluctuate. A possible example of such a situation is one in which the speed of data output processing of the area image sensor 15 or the processing for generating image data by the image data generation section 20 may differ for each line. The present invention may also, of course, be applied in a situation in which the processing speed differs for each line depending on the image-capturing conditions or the hardware used for capturing images. For example, the present invention can be applied to a configuration in which the vertical synchronization period or the horizontal synchronization period of the area image sensor 15 fluctuates, or the period needed for processing for generating image data fluctuates due to an operation of the operating section 55 by the user. The present invention can also be applied to a configuration in which the vertical synchronization period or the horizontal synchronization period of the area image sensor 15 fluctuates, or the period needed for processing for generating image data fluctuates due to the changing of an interchangeable EVF or an interchangeable lens.

As described above, in the subject image display region R1 in the present embodiment, the timing generator 30 adjusts the horizontal synchronization period TDH in accordance with the memory write end signal outputted from the image data output section 201. The horizontal synchronization signal DHsync may therefore be lengthened according to the progress of the processing for generating the image data to be displayed in the subject image display region R1, and the horizontal synchronization period TDH prescribed by the horizontal synchronization signal DHsync of the liquid crystal panel 42 is not necessarily constant. On the other hand, since the vertical synchronization period prescribed by the vertical synchronization signal DVsync is constant in the present embodiment, as described above, the timing generator 30 sets the output timing of the horizontal synchronization signal DHsync so that a horizontal synchronization period TDH2 is shorter than the abovementioned reference period TH in the information display region R2, so that displaying of all the lines of the liquid crystal panel 42 ends within the vertical synchronization period even in a case in which the horizontal synchronization period TDH in the subject image display region R1 is lengthened.

In other words, since the data (referred to as OSD data) of the characters indicating the image-capturing conditions or other information can be created in advance and recorded in advance in the VRAM 51 irrespective of operation of the area image sensor 15, an appropriate display can be performed without overtaking the reading of data even when a display based on the OSD data is executed according to a short horizontal synchronization period. Therefore, in the present embodiment, the horizontal synchronization period in the information display region R2 for displaying characters indicating image-capturing conditions or other information is set so as to be shorter than that of the subject image display region R1 for producing a display based on the output data of the area image sensor 15.

Specifically, the timing generator 30 adjusts the output timing of the horizontal synchronization signal DHsync, and thereby shortens the horizontal synchronization period TDH2 so that the sum of the differences of the lengthened horizontal synchronization period TDH and the reference period TH in the subject image display region R1, and the sum of the differences of the shortened horizontal synchronization period TDH2 and the reference period TH in the information display region R2 coincide. As a result, the following relation obtains: horizontal synchronization period TDH2<reference period≤horizontal synchronization period TDH. Various configurations can be adopted in the information display region R2 as configurations whereby the horizontal synchronization signal DHsync is outputted so that the horizontal synchronization period TDH2 is shorter than the reference period TH. For example, a configuration may be adopted in which the period of shortening in each line is the value ΔT2 obtained by dividing the sum (ΣΔT1) of the delay ΔT1 with respect to the horizontal synchronization period TDH by the number of lines L2 of the information display region R2, the delay ΔT1 being generated in the subject image display region R1. In other words, a configuration may be adopted in which the value of horizontal synchronization period TDH−ΔT2 is assumed to be the horizontal synchronization period TDH2 in the information display region R2.

As described above, in order to produce a suitable display in each region based on the horizontal synchronization signal adjusted for each region of the liquid crystal panel 42 in the present embodiment, the line numbers of the portions of the liquid crystal panel 42 that correspond to the subject image display region R1 and the information display region R2 are determined in advance. For example, in the example shown in FIG. 2, lines 1 through 682 are the subject image display region R1, and lines 683 through 768 are the information display region R2. Therefore, the timing generator 30 outputs the horizontal synchronization signal DHsync so that the horizontal synchronization period TDH2 is shorter than the abovementioned reference period TH during display in the information display region R2 that corresponds to lines 683 through 768, while the timing generator 30 outputs the horizontal synchronization signal DHsync at a timing in accordance with the abovementioned memory write end signal during display in the subject image display region R1 that corresponds to lines 1 through 682.

Through this configuration, display of image-capturing conditions or other information by the OSD data is performed within a short horizontal synchronization period in the information display region R2, while the subject captured by the area image sensor 15 is displayed in the subject image display region R1 in a state of minimal delay. Since the horizontal synchronization period is also controlled as described above so that the sum of the differences of the lengthened horizontal synchronization period TDH and the reference period TH in the subject image display region R1, and the sum of the differences of the shortened horizontal synchronization period TDH2 and the reference period TH in the information display region R2 coincide, display by the display section 40 can be performed in a state in which the cycles of the vertical synchronization signals SVsync, DVsync are the same and constant. Consequently, the display in the liquid crystal panel 42 of the subject captured by the area image sensor 15 is not delayed by the period of a single frame or longer, and the same image does not remain displayed on the liquid crystal panel 42 for a plurality of frame periods.

(3) Other Embodiments

The embodiment described above is an example of an implementation of the present invention, and a configuration may be adopted in which the read buffer 56 is omitted, and the image data can be acquired without problems occurring even when the VRAM 51 is accessed at the timing at which the display section 40 attempts to display the image data. At this time, the image data output section 201 outputs the memory write end signal (corresponding to the timing information) to the timing information acquisition section 30a at the time that outputting of the image data to the VRAM 51 is completed. The image data are then read line by line, one line at a time, from the VRAM 51 by the liquid crystal panel driver 41 at the timing (horizontal synchronization signal DHsync) instructed from the display control section 30b. Whether outputting of the image data to the memory is completed may thereby be specified for each line based on the timing information, and the image data of the $N^{th}$ line may be displayed after outputting of the image data of the $(N+i)^{th}$ line to the memory is completed. The image data of i lines which include the final line of the subject image display region R1 are then displayed without waiting for completion of the outputting of the image data of the $(N+i)^{th}$ line to the memory. Specifically, the image data of the final line of the subject image display region R1 are displayed after outputting thereof to the memory is completed. In this instance, N is a natural number (an integer greater than 0), and i is a nonnegative integer (an integer equal to 0 or greater). The processing is also not limited to being based on units of one line, and may be based on predetermined data units such as j lines, k pixels (where j and k are natural numbers), or other predetermined data units. In this case, the image data output section 201 outputs the memory write end signal (corresponding to the timing information) to the timing information acquisition section 30a at the time that outputting of the image data of a predetermined data unit to the VRAM 51 is completed. The image data are then read at predetermined data units at a time by the liquid crystal panel driver 41 from the VRAM 51 or the read buffer 56. The embodiments described hereinafter may also be combined with the embodiment described above, and various other embodiments are also possible.

In the embodiment described above, the horizontal synchronization signal SHsync is outputted so that the horizontal synchronization period is shorter in the information display region R2 of the liquid crystal panel 42 than in the subject image display region R1, in order to cause the cycle of the vertical synchronization signal SVsync of the area image sensor 15 and the cycle of the vertical synchronization signal DVsync of the liquid crystal panel 42 to coincide, but the cycle of the vertical synchronization signal SVsync and the cycle of the vertical synchronization signal DVsync of the liquid crystal panel 42 can be made to coincide by another method. For example, since the area image sensor 15 has a larger number of lines than the liquid crystal panel 42 in a normal image-capturing device, in a case in which the horizontal synchronization period that should be maintained within a specific vertical synchronization period is assumed to be equal, the horizontal synchronization signal DHsync of the liquid crystal panel 42 is shorter than the horizontal synchronization signal SHsync of the area image sensor 15. Consequently, even in a case in which the horizontal synchronization signal DHsync of the liquid crystal panel 42 is lengthened, it is not often necessary to lengthen the vertical synchronization period of the liquid crystal panel 42 according to the lengthening of the horizontal synchronization signal DHsync. In a case in which lengthening the horizontal synchronization signal DHsync causes the vertical synchronization signal DVsync of the liquid crystal panel 42 to be longer than the vertical synchronization signal SVsync of the area image sensor 15, the vertical synchronization signal SVsync of the area image sensor 15 may be lengthened, and the vertical synchronization signal DVsync and vertical synchronization signal SVsync may be synchronized.

Furthermore, a configuration may be adopted in which the timing information is acquired based on the processing of the final step (the resizing processing in the example described above, but this configuration is not limiting) of the processing for generating the image data. A configuration may also be adopted in which the timing information is acquired based on the processing of a step prior to the final step (e.g., a step in which the processing time may fluctuate), insofar as processing can be performed at such a high speed that the processing time of the final step of processing for generating the image data can be ignored, processing can be performed in a certain time, or it is possible to predict the timing at which the final step is ended or the generated image data are outputted. In a case in which an image processing step is included for referencing the data of a plurality of lines and generating data of a single line in the processing for generating the image data, the timing information may be acquired for the included step. In other words, the timing at which outputting of the image data to the first storage section is completed for each line may be computed based on the timing information, or may be specified as the timing at which the timing information is acquired.

Furthermore, the display section 40 is an EVF which uses a liquid crystal panel in the embodiment described above, but the display section 40 may be a display section other than an EVF. For example, the display section 40 may be a display section which uses a liquid crystal panel attached to a back surface of the image-capturing device 1, or the display section 40 may be configured to use a display section other than a liquid crystal panel. The image-capturing device 1 may also be a single-lens reflex camera provided with a mirror, the image-capturing device 1 may be a movie camera, or the image-capturing device 1 may be a mobile telephone or other device provided with image-capturing functionality. The color filters are also in a Bayer array in the area image sensor 15 described above, but the present invention may also be applied in an image-capturing device which utilizes a sensor configured in an arrangement other than a Bayer array. The line buffer 52*d* may be a line buffer, but may also be a VRAM provided with a recording capacity for recording the image data of a single frame. Through this configuration, various types of processing can be performed based on the image data to be displayed. The horizontal synchronization period is also preferably lengthened with respect to a reference period, and various types of periods can be assumed as the reference period. For example, the cycle of the horizontal synchronization signal SHsync of the area image sensor 15, the cycle for generating the image data, and other cycles may be used as the reference period. Furthermore, various forms may be adopted as the form in which various types of signals are transmitted from the timing generator 30 to the display section 40, and signals may be transmitted by HDMI (high-definition multimedia interface) and other methods. The directions in the embodiment described above may also be reversed. In the horizontal direction, for example, display may be performed from left to right or from right to left.

Furthermore, the OSD data are preferably image data indicating predetermined information to be displayed in the information display region of the display section, and a configuration may be adopted in which the predetermined information to be displayed includes various types of information other than that of image-capturing conditions, e.g., information indicating the remaining amount of power in a battery mounted in the image-capturing device 1, or other information. Various configurations other than the configuration described above may also be employed as the configuration for making the cycles of the vertical synchronization signals SVsync, DVsync the same and constant. For example, a configuration may be adopted in which, after display in the subject image display region R1 is performed, the smallest period that can be set for displaying the OSD data in the information display region R2 is used as the horizontal synchronization period in the information display region R2, whereby display of all the lines of the liquid crystal panel 42 is completed before the output timing of the vertical synchronization signal DVsync, and the vertical synchronization signal DVsync is outputted at a prescribed output timing after waiting for the remainder of the period.

An image-displaying device according to a first embodiment includes a first storage section, an image data generation section, a timing information acquisition section and a display control section. The image data generation section is configured to perform processing for generating image data indicative of an image of a subject based on output data from an image-capturing section that captures the image of the subject, and to output the image data to the first storage section with the image data being composed of a plurality of predetermined data units. The timing information acquisition section is configured to acquire timing information indicative of a timing related to generation of the image data in the image data generation section and output of the image data to the first storage section with respect to each of the predetermined data units of the image data. The display control section is configured to control a display section to read and display an Nth one of the predetermined data units of the image data in the display section after output of an (N+i)th one of the predetermined data units of the image data from the image data generation section to the first storage section is completed according to the timing information, where N is a natural number and i is a nonnegative integer.

For example, the image data of a single frame is composed of a plurality of predetermined data units.

In a case in which the first storage section is a memory accessed from various other blocks within the image-displaying device, a situation may occur in which image data cannot be immediately acquired, even when the display section requests acquisition of the image data from the first storage section, and a large delay time occurs between the acquisition request and actual acquisition (because, for example, the first storage section is busy). A configuration may therefore be adopted in which image data are transferred between the first storage section and the display section via a second storage section. In this case, the second storage section constitutes means for acquiring and accumulating from the first storage section the image data outputted to the first storage section, and is configured so as to acquire new image data from the first storage section when the already accumulated image data are read. The second storage section acquires and accumulates image data from the first storage section prior to the display timing of the display section, and the display section acquires and displays image data from the second storage section. (It is assumed that when the display section acquires image data from the second storage section, the image data can be acquired with a shorter delay time than in a case of acquiring the image data directly from the first storage section.)

The second storage section is preferably FIFO (ring buffer), wherein the oldest accumulated data are outputted first. When the image data accumulated in the second storage section are read, the second storage section acquires and accumulates new image data from the first storage section. New image data are image data subsequent to the newest accumulated data of the image data accumulated in the second storage section. For example, in a state in which Nth unit of image data are accumulated in the second storage section, when the Nth unit of image data begin to be read, (N+1)th image data are acquired and accumulated from the first storage section the same amount at a time as are read. In a state in which image data are accumulated to the upper limit of the size of the second storage section, the second storage section does not acquire the new image data from the first storage section even when new image data are outputted to the first storage section. The size of the second storage section is equal to or less than the size of the image data of i predetermined data units.

The image data generation section herein is preferably capable of generating image data indicating an image of a subject based on output data of an image-capturing section (e.g., an area image sensor), and outputting the generated image data to the first storage section, and the image data generation section is preferably capable of displaying the image of the subject based on the image data in the display section. The image data outputted to the first storage section are accumulated in the first storage section without modification unless overwriting with other data, resetting, or the like is particularly performed. The processing for generating the image data may be composed of any type of image processing, and the period required for processing may fluctuate according to the output data of the image-capturing sensor, a mode in the image-displaying device, the image-capturing conditions, or other factors.

The timing information acquisition section is preferably capable of acquiring timing information which indicates the timing at which outputting of image data for individual predetermined data units to the first storage section is completed. In other words, the timing information may be defined as information from which it is possible to determine whether the image data for which generation processing is completed have finished outputting to the first storage section by predetermined data units. For example, in a case in which the processing for generating the image data is performed by a plurality of image processing steps, the timing information may be information indicating the timing at which a predetermined step is ended. Timing information indicating the timing at which outputting is completed may be acquired by the timing information acquisition section prior to completion of outputting, and used to compute the timing at which outputting will be completed, or the timing information may be acquired by the timing information acquisition section in response to the completion of outputting.

The display control section is preferably a block for controlling the display timing of image data for each predetermined data unit, and in the display control section, a condition for starting display of any Nth unit of image data is the ending of processing for generating the (N+i)th unit of image data and the completion of outputting of the (N+i)th unit of image data to the first storage section. In a configuration other than that of the embodiment, in a situation in which the Nth unit of image data are read from the second storage section immediately after the Nth unit of image data are outputted to the first storage section and without waiting for outputting of the (N+1)th unit of image data to be completed, the second storage section acquires the (N+1)th unit of image data from the first storage section the same amount at a time as is read when the Nth unit of image data begins to be read. However, at this time, outputting of the (N+1)th unit of image data to the first storage section may not yet be completed, in which case, incorrect data which differ from the (N+1)th unit of image data are accumulated in the second storage section, and the incorrect data are transferred and displayed in the display section.

Therefore, since the display control section causes the Nth unit of image data to be read from the second storage section and displayed after outputting of the (N+i)th unit of image data to the first storage section is completed, when the size of the second storage section is assumed to be the size of i units of image data, the (N+i)th unit of image data can be acquired from the first storage section the same amount at a time as is read when the Nth unit of image data are read from the second storage section. The reason for this is that outputting of the (N+i)th image data to the first storage section is already completed by this time. As a result, the image data can be read and displayed in the display section always in the order in which the image data is outputted to the first storage section, and it is therefore possible to prevent the display from becoming disordered by the displaying of incorrect data.

The condition for starting display of the Nth unit of image data may be completion of outputting of at least the (N+1)th unit of image data to the first storage section, and the Nth unit of image data may be displayed after outputting of the (N+2)th or subsequent unit of image data to the first storage section is completed, insofar as there are no limitations such as discarding of the Nth unit of image data from the first storage section, or there are no problems such as a noticeable delay between the movement of the subject and the image displayed in the display section.

A configuration may also be adopted in which the display control section determines whether the Nth unit of image data is the final predetermined data unit when i is a natural number, and in a case in which a determination is made that the Nth unit is the final predetermined data unit, the display control section causes the Nth unit of image data to be displayed in the display section without waiting for outputting of the (N+1)th and subsequent image data to the first storage section to be completed after outputting of the Nth unit of image data to the first storage section is completed. As a result, it is possible to avoid a situation in which the image data of the final predetermined data unit can no longer be displayed, due to the process waiting for completion of the outputting of image data of the final predetermined data unit and subsequent predetermined data units, regardless of the fact that no more image data of the final predetermined data unit and subsequent predetermined data units in a certain frame are outputted to the first storage section.

It is also possible to apply as a program or a method the technique whereby determination is made for each predetermined data unit as to whether outputting of the image data to the first storage section is completed, and the Nth unit of image data are displayed after outputting of the (N+i)th image data to the first storage section is completed. The present embodiment may also be applied as a display timing control circuit comprising the timing information acquisition section and the display control section described above. A device, program, or method such as described above may be implemented as an independent device or by utilizing a shared component in a device having multiple functions, and various types of embodiments are included.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An image-displaying device comprising:
a storage section;
an image data generation section configured to perform processing for generating image data indicative of an image of a subject based on output data from an image-capturing section that captures the image of the subject, and to output the image data to the storage section with the image data including an Nth image data and an (N+i)th image data, where N is a natural number and i is a nonnegative integer;
a timing information acquisition section configured to acquire timing information indicative of a timing related to generation of the image data in the image data generation section and a timing at which output of each of the Nth image data and the (N+i)th image data to the storage section is completed; and
a display control section configured to control a display section to commence reading and displaying the Nth image data in the display section in accordance with the timing information acquisition section receiving the timing information indicating that the output of the (N+i)th image data from the image data generation section to the storage section is completed.

2. The image-displaying device according to claim 1, wherein
the display control section is configured to determine whether the Nth image data is a last one of the image data, and to control the display section to display the Nth image data without waiting for completion of output of the (N+i)th image data to the storage section when it is determined that the Nth image data is the last one of the image data.

3. An electronic apparatus, comprising:
the image-displaying device according to claim 1.

4. An image-displaying device comprising:
an image-capturing section configured to output capturing data of a subject;
an image data generation section configured to generate image data based on the capturing data from the image-capturing section and output a variable timing information in accordance with a generating condition of the image data;
a storage section configured to store the image data;
a display section configured to display the image data stored in the storage section,
wherein the display section is configured to display Nth image data of the image data according to the variable timing information of (N+i)th image data of the image data, where N is a natural number and i is a nonnegative integer.

5. The image-displaying device according to claim 4, wherein
the display section is further configured to display the Nth image data without waiting for completion of output of the (N+i)th image data to the storage section when it is determined that the Nth image data is the last one of the image data.

6. An electronic apparatus, comprising:
the image-displaying device according to claim 4.

7. An image-displaying control device comprising:
an image data generation section configured to generate image data to display by a display section and output the image data;
a storage section configured to store the image data; and
a timing information acquisition section configured to acquire a variable timing information in accordance with a generating condition of the image data in the image data generation section; and
a display control section configured to control the display section to read Nth image data of the image data from the storage section according to the variable timing information of (N+i)th image data of the image data, where N is a natural number and i is a nonnegative integer.

8. The image-displaying device according to claim 7, wherein
the display section is configured to display the Nth image data without waiting for completion of output of the (N+i)th image data to the storage section when it is determined that the Nth image data is the last one of the image data.

9. An electronic apparatus, comprising:
the image-displaying device according to claim 8.

10. An image-displaying device comprising:
a display section configured to display image data,
an image data generation section configured to generate the image data and output a variable timing information in accordance with a generating condition of the image data;
a storage section configured to store the image data; and
a display control section configured to control the display section to read Nth image data of the image data from the storage section according to the variable timing information of (N+i)th image data of the image data and display the Nth image data of the image data, where N is a natural number and i is a nonnegative integer.

11. The image-displaying device according to claim 10, wherein
the display section is further configured to display the Nth image data without waiting for completion of output of the (N+i)th image data to the storage section when it is determined that the Nth image data is the last one of the image data.

12. An electronic apparatus, comprising:
the image-displaying device according to claim 10.

* * * * *